United States Patent
Richardson

(10) Patent No.: US 7,216,186 B2
(45) Date of Patent: May 8, 2007

(54) CONTROLLING DATA FLOW BETWEEN PROCESSOR SYSTEMS

(75) Inventor: Ray M. Richardson, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 09/964,681

(22) Filed: Sep. 27, 2001

(65) Prior Publication Data

US 2003/0061414 A1 Mar. 27, 2003

(51) Int. Cl.
*G06F 3/00* (2006.01)

(52) U.S. Cl. .............................. 710/53; 710/22; 710/48; 710/52

(58) Field of Classification Search .............. 710/8–14, 710/22, 308, 48, 52, 53; 709/230–237, 212
See application file for complete search history.

(56) References Cited

U.S. PATENT DOCUMENTS

| | | | | |
|---|---|---|---|---|
| 4,543,627 A | * | 9/1985 | Schwab | 709/212 |
| 5,524,134 A | * | 6/1996 | Gustafson et al. | 455/410 |
| 5,568,443 A | * | 10/1996 | Dixon et al. | 365/230.05 |
| 5,781,799 A | * | 7/1998 | Leger et al. | 710/22 |
| 5,898,841 A | * | 4/1999 | Higgins | 709/236 |
| 5,991,298 A | * | 11/1999 | Hunt et al. | 370/390 |
| 6,412,029 B1 | * | 6/2002 | Mecklai et al. | 710/22 |
| 6,473,808 B1 | * | 10/2002 | Yeivin et al. | 710/6 |
| 6,651,111 B2 | * | 11/2003 | Sherman et al. | 710/14 |
| 6,754,732 B1 | * | 6/2004 | Dixon et al. | 710/22 |

OTHER PUBLICATIONS

Deital & Deital, C++ How to Program, 2000, Prentice Hall, Third Edition, p. 810.*

Valvano, Jonathan W., Developing Software in Assembly Language—First In First Out Queue from the Book Embedded Microcomputer Systems: Real Time Interfacing, 1999, Brooks-Cole, pp. 1-4.*

* cited by examiner

*Primary Examiner*—Kim Huynh
*Assistant Examiner*—Eron Sorrell
(74) *Attorney, Agent, or Firm*—Trop, Pruner & Hu, P.C.

(57) ABSTRACT

Direct memory access data transfers may be initiated between buffers on one processor system to corresponding buffers in another processor system. The buffers in each system may be provided as a linked list such that transfers successively occur between the buffers. Each buffer may include a descriptor that indicates whether or not the buffer is full or empty. As a result, the buffer may be accessed by controllers in either processor system.

21 Claims, 3 Drawing Sheets

CONTROLLING DATA FLOW BETWEEN PROCESSOR SYSTEMS

BACKGROUND

This invention relates generally to processor-based systems and particularly to systems including two separate processor systems that communicate with one another.

In many wireless systems, a baseband processor is available to handle communication tasks. A multimedia processor is generally available for the wealth of non-communication-based tasks. For example, in cellular telephones, the baseband processor may be responsible for implementing the relevant wireless protocol. Conversely, the multimedia processor may be responsible for controlling the display, providing games, and implementing address book and calendar features and the like.

Thus, it is convenient in many wireless systems to provide two processors that operate as intercommunicating systems. That is, each processor system communicates with the other processor system. The processor systems may be separately integrated or commonly integrated on the same chip.

Direct memory access or DMA forms a second data channel between peripherals and main memory through which a peripheral can directly access the main memory without the help of the processor to read or write data. DMA may be implemented by a DMA controller.

Existing DMA controllers are primarily concerned with the internal data flows of a particular process or processor. Streaming data flows between different processors in the same processor-based system add additional complexities that may lead to flow bottlenecks and inefficient use of processor resources. Each DMA controller, in a multi-processor system, may be focused on its associated processor, resulting in too many interrupts to each processor.

Thus, there is a need, in multi-processor systems, to facilitate DMA operations.

DETAILED DESCRIPTION

Figure 1:
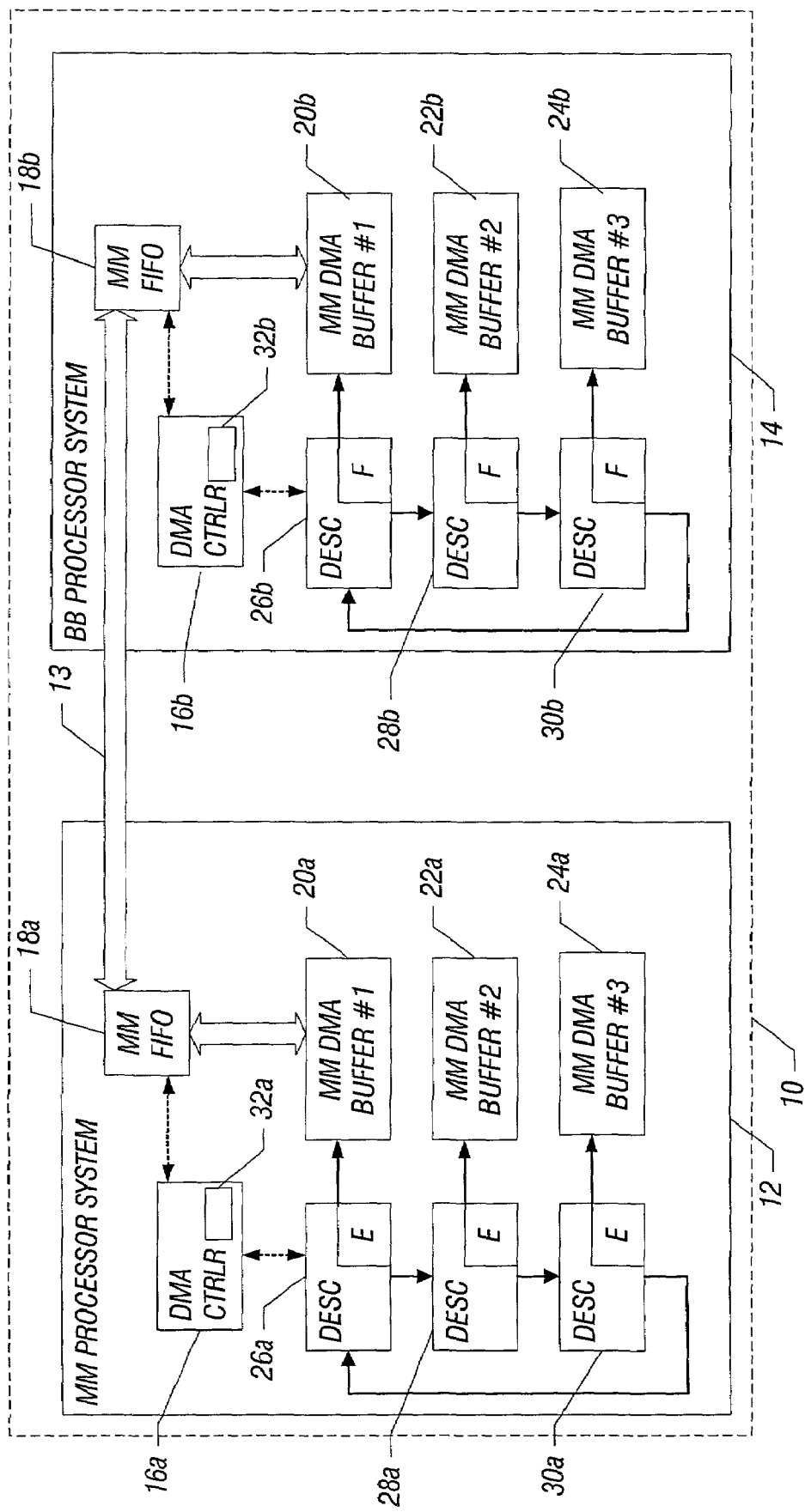
FIG. 1 is a block depiction of a system in accordance with one embodiment of the present invention.

Referring to FIG. 1, a processor-based system 10 may include a pair of processor systems 12 and 14. In one embodiment, the system 10 is a wireless communication system, such as a cellular telephone. The systems 12 and 14 communicate over a bus 13. In one embodiment, the system 12 may be a multimedia processor system and the system 14 may be a baseband processor system. The systems 12 and 14 may be integrated on separate or the same integrated circuit.

The system 12 may include a first-in-first-out (FIFO) buffer 18a that is coupled to a direct memory access (DMA) controller 16a that includes a storage 32a in one embodiment. The controller 16a communicates with a linked list of descriptors, indicated as descriptors 26a, 28a, and 30a. Each descriptor 26a, 28a, and 30a is coupled to its respective buffer 20a, 22a, and 24a. The descriptors 26-30 include flags that indicate whether the associated buffer is either empty or full. In the illustrated embodiment, the buffers 20a, 22a, and 24a are illustrated as being in their empty state following a transfer to the system 14, for example.

Similarly, the system 14 includes a first-in-first-out (FIFO) buffer 18b, a controller 16b with a storage 32b in one embodiment. The descriptors 26b, 28b, and 30b are arranged in a linked list, and coupled to associated buffers 20b, 22b, and 24b.

Through the use of the buffers 20-24 and descriptors 26-30, inter-processor data flow may be made more efficient in some embodiments. Each of the buffers 20-24 are maintained as a linked list with descriptors 26-30 acting as queue flags to indicate whether the associated buffer 20-24 is either empty or full. This enables software on each system 12 or 14 to freely interact with any of the buffers 20-24.

As shown in FIG. 1, immediately following a data transfer, the buffers 20a-24a are designated by descriptors 26a-30a as being empty while the buffers 20b-24b are indicated by their descriptors 26b-30b as being full.

Figure 2:
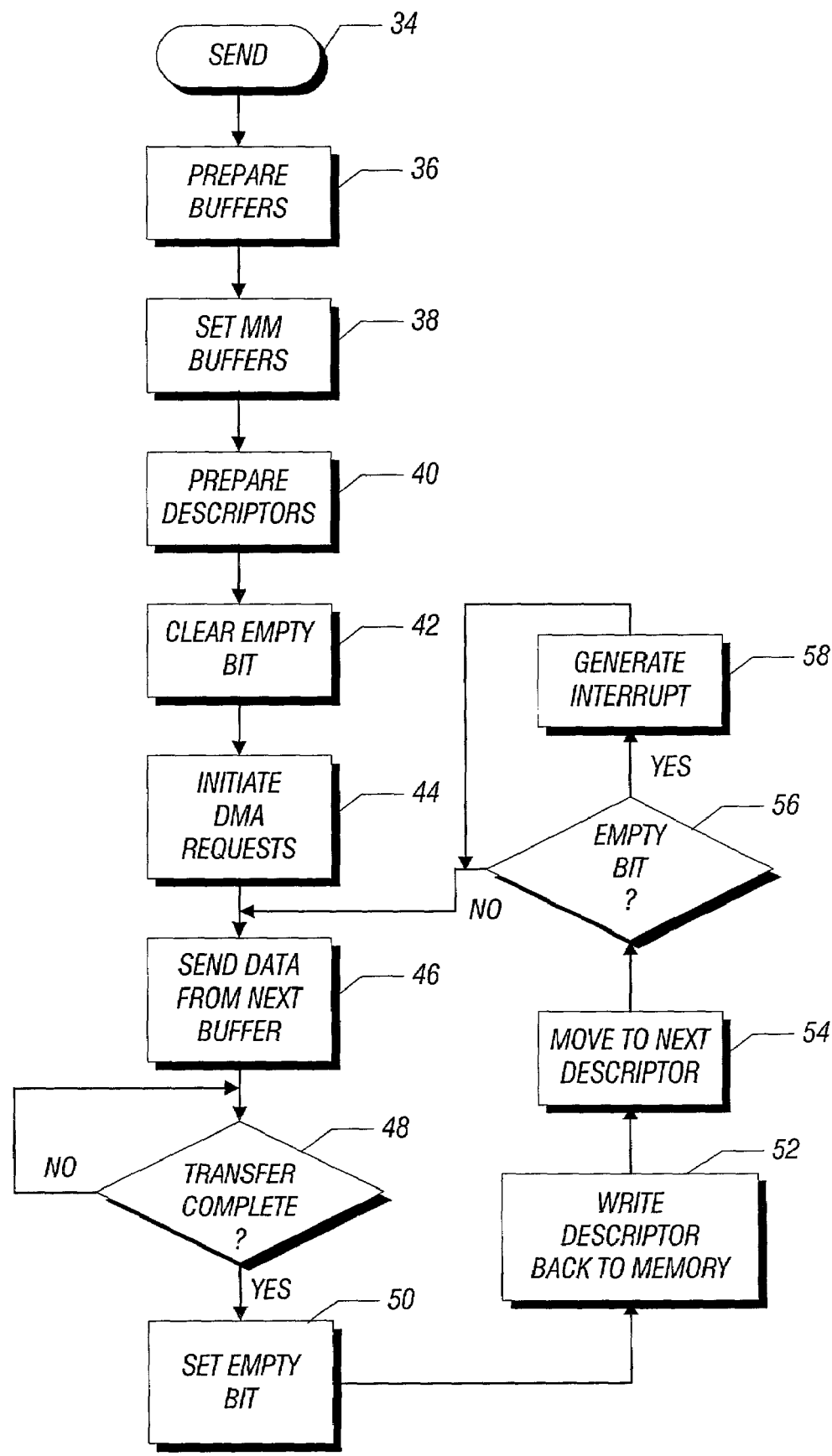
FIG. 2 is a flow chart for "send" software in accordance with one embodiment of the present invention.

Turning to FIG. 2, the software 34, that may, for example, be stored in the storage 32a and 32b, may send information across the bus 13 from the system 12 to the system 14, in one example. If both systems 12 and 14 are aware of an impending data transfer, the buffers 20-24 on each side of the interface 13 are prepared as indicated in block 36. The buffers 20a-24b are set with the first data to send as indicated in block 38. The descriptors 26-30 for each linked buffer 20a-24b are prepared in linked list fashion as indicated in block 40. Then, the empty bit is set for each buffer, as indicated in block 42. When ready, DMA requests on both sides are initiated by the corresponding FIFOs 18, as indicated in block 44. The DMA transfer then begins, as indicated in block 46. Data may stream from the buffers 20a-24a through the interface 13 and the FIFO 18b to the buffers 20b-24b on the system 14.

When data transfer from one source buffer is complete, as determined at diamond 48, the DMA controller 16a sets the empty bit in the corresponding descriptor, as indicated in block 50. The controller 16a then writes the descriptor back to memory, as indicated in block 52, and moves on to the next descriptor in the linked list as indicated in block 54. Before transferring the data from a buffer, the controller 16a checks the empty bit, as indicated in diamond 56. If the empty bit is set, the controller 16a causes an interrupt, as indicated in block 58. Software intercepts this interrupt, fills the buffers 20a-24a with more data, clears the empty bit in each descriptor 26a-30a and starts the DMA channel again by setting a run bit.

Figure 3:
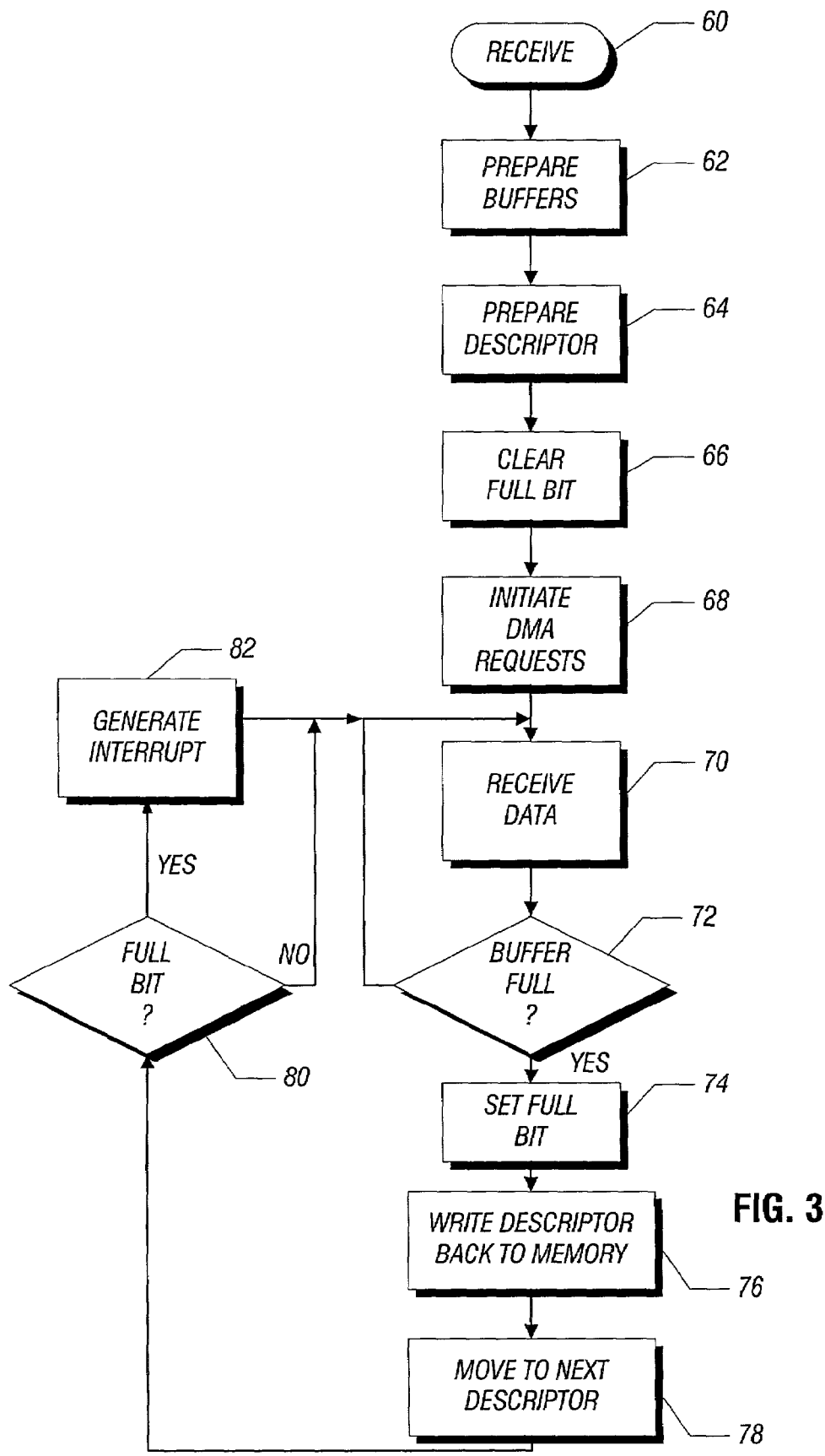
FIG. 3 is a flowchart for "receive" software in accordance with one embodiment of the present invention.

As shown in FIG. 3, the receive software 60 prepares the buffers 20b-24b in the system 14, as indicated in block 62. The software 60 may be stored in storage 32. The descriptors are prepared, as indicated in block 64, the full bit is clear as indicated in block 66 and the DMA channels are prepared to receive the data. When ready, the DMA requests are initiated by the FIFOs 18, as indicated in the block 68. The DMA transfer then proceeds, as indicated in block 70, with data streaming from memory buffers in one processor system (12 or 14) to the other processor system (12 or 14).

When the data transfer from the source buffers (in this case the buffers 20a-24a) is complete, a check at diamond 72 determines when a target buffer is full. The controller 16b sets the full bit, as indicated in block 74 in the corresponding descriptor 26b-30b, writes the descriptor back to memory, as indicated in block 76, and moves on to the next descriptor in the linked list, as indicated in block 78. Before the controller 16b attempts to fill the next buffer, it checks the full bit, as indicated in diamond 80. If the full bit is set, the controller 16b generates an interrupt, as shown in block 82. Software intercepts this interrupt, copies the buffers into other locations, clears the full bit in each descriptor and starts the DMA channel again by setting the run bit.

In some embodiments, the software is able to detect empty and full buffers and, even as DMA transfer continues, perform the necessary handling before an interrupt becomes necessary. In this manner, the number of interrupts may be greatly reduced. Thus, source buffers may be refilled and target buffers may be emptied to continue data transfer.

In one embodiment, the empty and full flags may be fully interchangeable. In such an embodiment, the same flag may be used to indicate "empty" when the DMA buffer descriptor is used to transmit data and "full" when the DMA buffer descriptor is used to receive data.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   initiating a direct memory access;
   successively transferring data from a plurality of linked buffers in a first processor system to a plurality of linked buffers in a second processor system; and
   generating an interrupt when one of the linked buffers is empty, based on a flag associated with a descriptor for the one of the linked buffers, intercepting the interrupt, and automatically filling the one of the linked buffers.

2. The method of claim 1 including determining whether one of the linked buffers that is to receive data is full based on a flag associated with a descriptor for the one of the linked buffers and if the one of the linked buffers is full, automatically generating an interrupt, intercepting the interrupt, and automatically emptying the one of the linked buffers.

3. An article comprising a computer-readable medium storing instructions that when executed enable a processor-based system to:
   initiate a direct memory access;
   successively transfer data from a plurality of linked buffers in a first processor system to a plurality of linked buffers in a second processor system; and
   determine whether one of the linked buffers that is to receive data is full based on a flag associated with a descriptor for the one of the linked buffers and if the buffer is full, automatically generate an interrupt, intercept the interrupt, and automatically empty the buffer.

4. The article of claim 3 further storing instructions that enable the processor-based system to successively transfer data from the plurality of linked buffers arranged in a linked list on the first processor system to the plurality of linked buffers arranged in a linked list on the second processor system.

5. The article of claim 4 further storing instructions that enable the processor-based system to provide the linked list with descriptors that indicate the status of each of said buffers.

6. The article of claim 5 further storing instructions that enable the processor-based system to provide in the descriptors of the linked list flags that indicate whether a corresponding buffer is empty or full.

7. The article of claim 3 further storing instructions that enable the processor-based system to transfer data between the plurality of linked buffers within a cellular telephone.

8. The article of claim 7 further storing instructions that enable the processor-based system to transfer data between the first processor system that includes a baseband processor and the second processor system that includes a multimedia processor of the cellular telephone.

9. The article of claim 3 further storing instructions that enable the processor-based system to generate an interrupt when one of the linked buffers is empty, based on a flag associated with a descriptor for the one of the linked buffers, intercept the interrupt, and automatically fill the buffer.

10. A system comprising:
    a processor; and
    a storage coupled to said processor to store instructions that enable the processor to:
      initiate a direct memory access;
      successively transfer data from a plurality of linked buffers in a first processor system to a plurality of linked buffers in a second processor system; and
      generate an interrupt when one of the linked buffers is empty, based on a flag associated wit a descriptor for the one of the linked buffers, intercept the interrupt, and automatically fill the buffer.

11. The system of claim 10 wherein said storage stores instructions that enable the processor to successively transfer data from the plurality of linked buffers arranged in a linked list on the first processor system to the plurality of buffers arranged in a linked list on the second processor system.

12. The system of claim 11 wherein said storage stores instructions that enable the processor to provide the linked list with descriptors that indicate the status of each of said buffers.

13. The system of claim 12 wherein said storage stores instructions that enable the processor to provide in the descriptors of the linked list flags that indicate whether a corresponding buffer is empty or full.

14. The system of claim 10 wherein said plurality of linked buffers are within a cellular telephone.

15. The system of claim 14 wherein said processor comprises a baseband processor, said system further including a multimedia processor.

16. The system of claim 10 wherein said storage stores instructions that enable the processor to determine whether one of the linked buffers that is to receive data is full based on a flag associated with a descriptor for the one of the linked buffers and if the buffer is full, automatically generate an interrupt, intercept the interrupt, and automatically empty the buffer.

17. The method of claim 1, further comprising successively transferring the data directly from the first processor system to the second processor system via an internal bus of a wireless communication system.

18. The article of claim 3, further storing instructions that enable the system to successively transfer the data via a first-in-first-out buffer in the first processor system directly to a first-in-first-out buffer in the second processor system.

19. The article of claim 3, further storing instructions that enable the system to successively transfer the data directly from the first processor system to the second processor system via an internal bus of a wireless communication system.

20. The system of claim 10 wherein the first processor system comprises a first-in-first-out buffer coupled to the linked buffers.

21. The system of claim 10, wherein the system comprises a wireless communication system comprising the first processor system and the second processor system, the wireless communication system further comprising an internal bus to couple the first processor system and the second processor system.

* * * * *

UNITED STATES PATENT AND TRADEMARK OFFICE
CERTIFICATE OF CORRECTION

| | | |
|---|---|---|
| PATENT NO. | : 7,216,186 B2 | Page 1 of 1 |
| APPLICATION NO. | : 09/964681 | |
| DATED | : May 8, 2007 | |
| INVENTOR(S) | : Ray M. Richardson | |

It is certified that error appears in the above-identified patent and that said Letters Patent is hereby corrected as shown below:

Column 4:
Line 13, "wit" should be --with--.

Signed and Sealed this

Fourteenth Day of August, 2007

JON W. DUDAS
*Director of the United States Patent and Trademark Office*